United States Patent
Kobayashi et al.

(10) Patent No.: US 7,626,806 B2
(45) Date of Patent: Dec. 1, 2009

(54) ELECTRONIC DEVICE AND RECEIVING MEMBER

(75) Inventors: Sonomasa Kobayashi, Kawasaki (JP); Nobuyoshi Yamamoto, Kato (JP)

(73) Assignee: Fujitsu Limited, Kawasaki (JP)

( * ) Notice: Subject to any disclaimer, the term of this patent is extended or adjusted under 35 U.S.C. 154(b) by 4 days.

(21) Appl. No.: 12/213,564

(22) Filed: Jun. 20, 2008

(65) Prior Publication Data

US 2009/0009948 A1    Jan. 8, 2009

(30) Foreign Application Priority Data

Jul. 2, 2007   (JP) .............................. 2007-174452

(51) Int. Cl.
   *G06F 1/16*    (2006.01)
(52) U.S. Cl. ............. 361/679.05; 362/547; 165/104.33; 455/127.1; 343/792.5
(58) Field of Classification Search ................. 362/494, 362/547, 276, 345; 257/659, 678; 455/127.1; 165/104.11, 104.33, 299; 343/792.5; 361/679.27, 361/679.15, 679.16, 679.53
See application file for complete search history.

(56) References Cited

U.S. PATENT DOCUMENTS

| 6,353,529 | B1 * | 3/2002 | Cies ..................... 361/679.05 |
| 2006/0116157 | A1 * | 6/2006 | Takamori et al. ......... 455/550.1 |
| 2007/0097611 | A1 * | 5/2007 | Takamori et al. ............ 361/683 |

FOREIGN PATENT DOCUMENTS

| JP | 5-67063 | 9/1993 |
| JP | 2005-136912 | 5/2005 |

* cited by examiner

*Primary Examiner*—Hung V Duong
(74) *Attorney, Agent, or Firm*—Staas & Halsey (57) ABSTRACT

An electronic apparatus having an upper housing, a lower housing to which the upper housing is connected so as to be openable and closable, where the lower housing is formed with a signal line path running near a connecting portion with the upper housing and the signal line path has a signal line disposed therein. A receiving member having a base portion accommodated in the lower housing, a receiving portion provided upright on the base portion and protruding above an upper surface of the lower housing to receive the upper housing from below, and a first fin portion protruding frontward from the base portion to extend over the signal line path.

14 Claims, 7 Drawing Sheets

ELECTRONIC DEVICE AND RECEIVING MEMBER

CROSS-REFERENCE TO RELATED APPLICATIONS

This application is based upon and claims the benefit of priority from the prior Japanese Patent Application No. 2007-174452 filed on Jul. 2, 2007, the entire contents of which are incorporated herein by reference.

BACKGROUND

There is widely used in portable electronic devices such as laptop personal computers and cellular phones a structure in which an upper housing provided with a display screen is connected to a lower housing provided with a keyboard or push buttons so as to be openable and closable. Such an electronic device enables a user to carry the device folded such that the lower housing and upper housing are superposed, and in operation, the user can open the upper housing to use the keyboard or push buttons. In this way, portability of the electronic device is improved without miniaturizing the keyboard, push buttons or the like.

Recently, not only cellular phones but also laptop personal computers are equipped with communication function or photographing function, as disclosed in Japanese Patent Laid-Open No. 2005-136912. A personal computer equipped with communication function or photographing function often has an electronic component such as an antenna or camera attached beside the display screen in the upper housing, where information obtained by the electronic component is transmitted through signal lines to a control circuit in the lower housing.

Here, in the upper housing and lower housing are deployed many electronic components such as the above-described camera or antenna, a display panel, the keyboard and the control circuit, where such electronic components are connected by signal lines. Generally, grooves for the signal lines are provided in the housings and the signal lines are disposed in the grooves. However, signal lines merely disposed in the grooves would easily get out of the grooves and, as a result, when assembling the electronic device, the signal lines would possibly interfere with installation of other electronic components or be pulled out of an electronic component.

As a method for solving this problem, signal lines disposed in the grooves are sometimes fixed therein with tapes.

However, the method of disposing signal lines in the grooves and further applying tapes to the signal lines increases the number of assembly steps associated with the electronic device as well as increases the manufacturing cost. There is also a problem that, when repairing the electronic device, the repairer needs to peel off the tapes before extracting the signal lines and apply the tapes again after the repair is finished, which makes the work very troublesome for the repairer. Further, the temperature in the electronic device can be high due to the heat generated by the electronic components; this environment accelerates deterioration of the tapes with aging, and in a relatively short time the tapes peel off easily and do not serve the function of maintaining the fixation of the signal lines. Particularly, in the case of a portable electronic device, the tapes peel off more easily due to vibrations caused by carrying the electronic device.

These problems arise not only in personal computers and cellular phones but generally in electronic devices wired with signal lines in the housings.

SUMMARY

The disclosed electronic device including an upper housing, a lower housing to which the upper housing is connected so as to be openable and closable, where the lower housing is formed with a signal line path running near a connecting portion with the upper housing, and the signal line path has a signal line disposed therein, and a receiving member having a base portion accommodated in the lower housing. The disclosed electronic device includes a receiving portion provided upright on the base portion and protruding above an upper surface of the lower housing to receive the upper housing from below, and a first fin portion protruding frontward from the base portion to extend over the signal line path.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments, examples of which are illustrated in the accompanying drawings, wherein like reference numerals refer to the like elements throughout. The embodiments are described below to explain the present invention by referring to the figures.

Hereafter, an embodiment of the present electronic device will be described with reference to the drawings.

Figure 1:
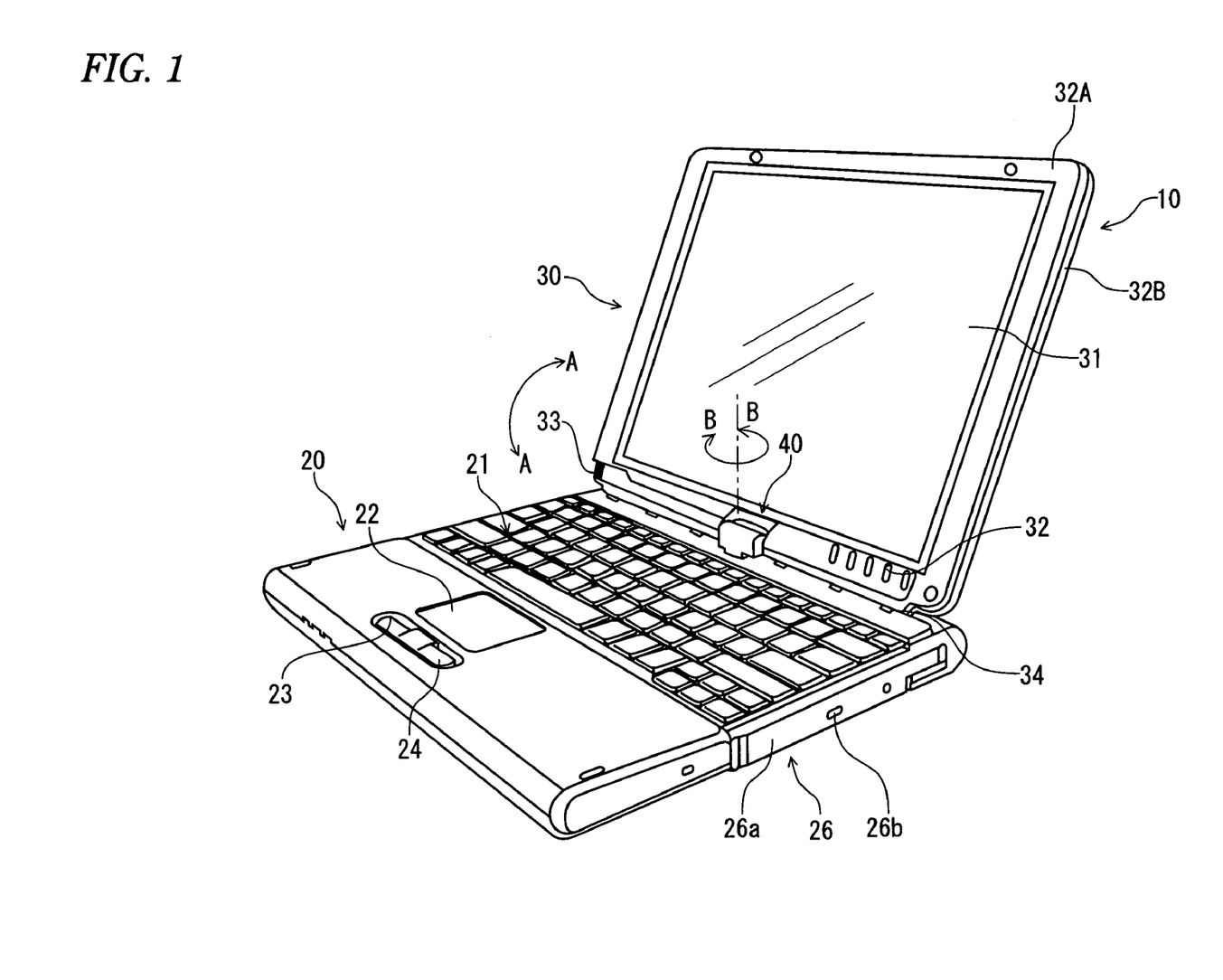
FIG. 1 is a perspective view of a personal computer according to an embodiment of an electronic device.

FIG. 1 is a perspective view of a personal computer according to an embodiment of an electronic device.

The personal computer 10 shown in FIG. 1 has as an input device an electromagnetic induction type digitizer mounted on a back side of a display screen 31, and detects a position on the display screen 31 indicated by a stylus. By such a configuration, the personal computer 10 enables an input including by indication. This input device may be a touch panel mounted on the display screen 31, instead of the digitizer and stylus.

The personal computer 10 has a main body unit 20 and a display unit 30. The display unit 30 is connected with the main body unit 20 by a biaxial connector unit 40 so as to be openable and closable in a direction of an arrow A-A and rotatable in a direction of an arrow B-B (about a rotational axis perpendicular to the main body unit 20) with respect to the main body unit 20. In the FIG. 1, the personal computer 10 is shown in a state in which the display unit 30 is opened with respect to the main body unit 20 (an open state). This open state corresponds to a first state of use.

The main body unit 20 has a keyboard 21, a track pad 22, a left click button 23 and a right click button 24. The main body unit 20 further has a display unit receiving member 34 which receives the display unit 30 from below. The display unit receiving member 34 serves as an exemplary receiving member. The main body unit 20 also has on one side thereof an opening and closing cover 26a for an optical disk drive 26 in which an optical disk such as a CD or DVD is mounted to be driven and accessed. The opening and closing cover 26a has an eject button 26b which is pressed to open the opening and closing cover 26a.

The display unit 30 of the personal computer 10 has on the front surface thereof a display screen 31. The display unit 30 has several press buttons 32, for example, in the right end below the display screen 31. The display unit 30 also has on the left end thereof, for example, a fingerprint sensor 33 which performs fingerprint authentication by being traced with a fingertip. In the display unit 30, the display screen 31 is sandwiched between the front and rear sides by a front casing 32A and a rear casing 32B, in the space defined by which casings is accommodated a later-described antenna for performing communication or the like. In the open state shown in FIG. 1, information is displayed on the display screen 31 with the direction of the rotational axis of the display unit 30 as the up-and-down direction.

Figure 2:
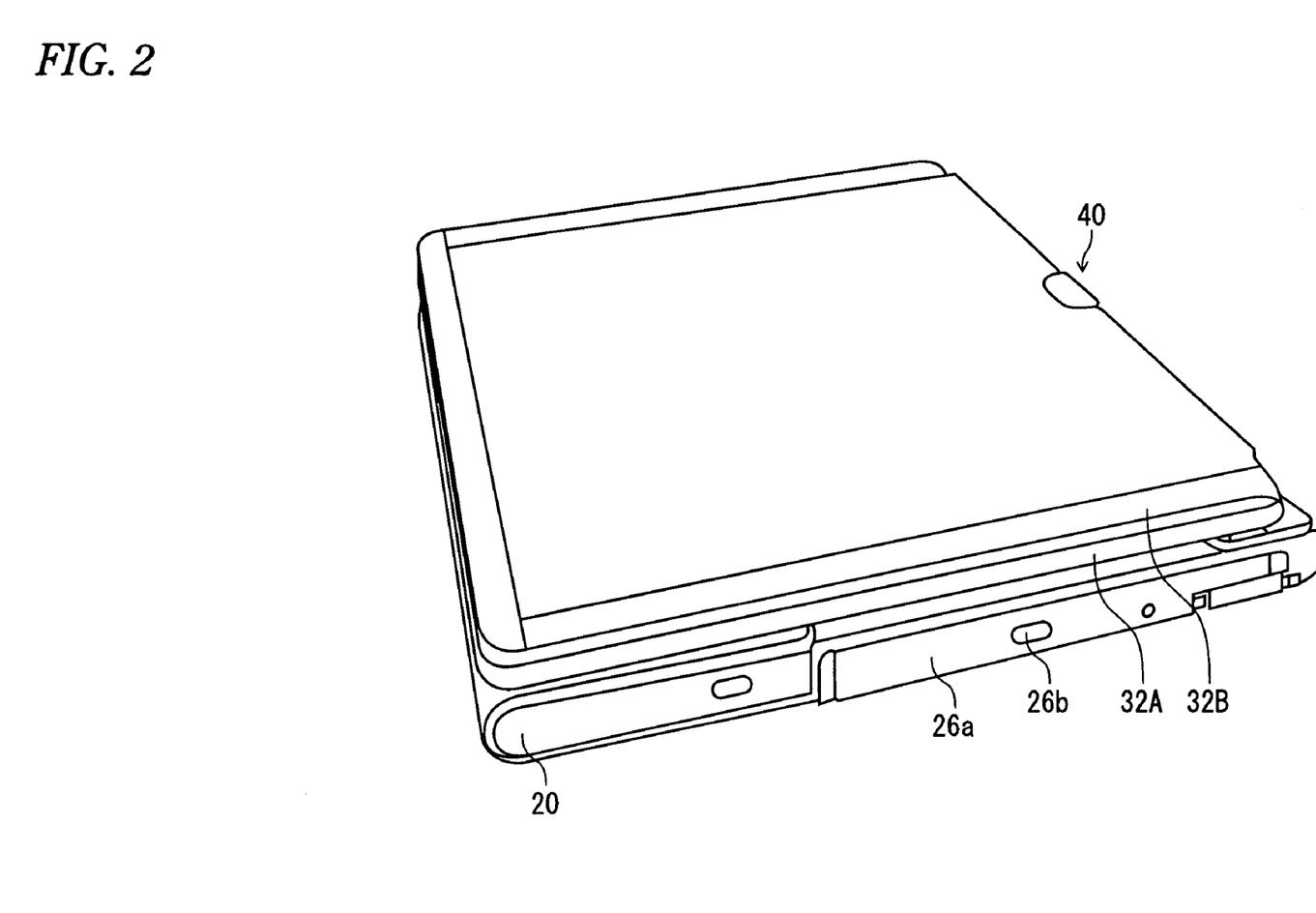
FIG. 2 is a perspective view illustrating a personal computer with a display unit closed over a main body unit.

FIG. 2 is a perspective view showing the personal computer with the display unit closed over the main body unit. In FIG. 2, the display unit 30 is in a state of being overlaid on the main body unit 20 with the display screen 31 (see FIG. 1) facing the main body unit 20. Hereafter, this state is referred to as a first closed state.

Upon closing the display unit 30 along the direction of the arrow A from the open state shown in FIG. 1, the personal computer 10 gets in the first closed state, where the display screen 31 is hidden inside and the back surface with respect to the display screen 31 is exposed outside, as shown in FIG. 2. The personal computer 10 in the first closed state can avoid staining or breakage of the display screen 31, providing portability.

Figure 3:
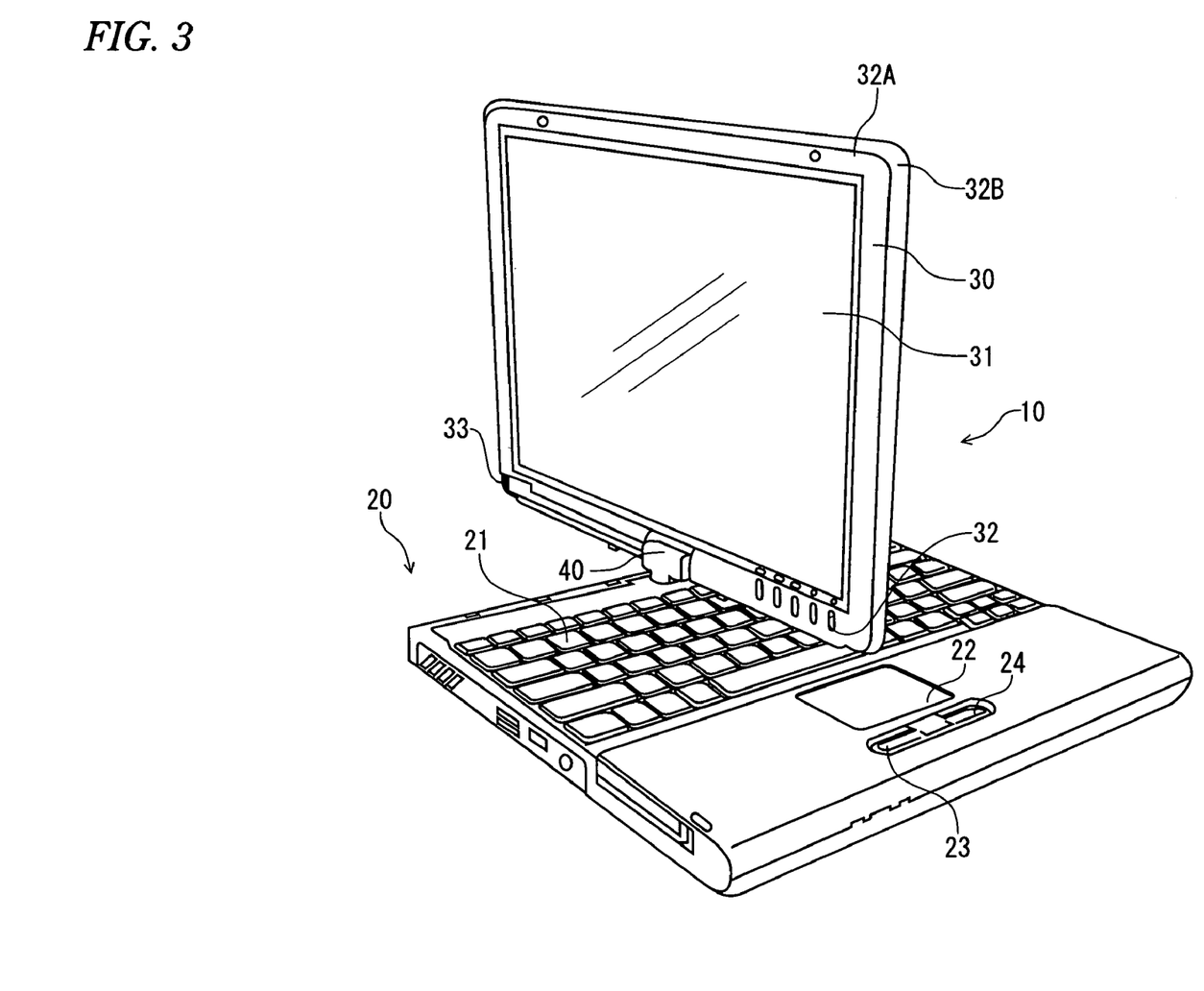
FIG. 3 is a perspective view illustrating a personal computer with a display unit rotated substantially 90 degrees with respect to a main body unit.

FIG. 3 is a perspective view showing the personal computer 10 with the display unit 30 rotated substantially 90 degrees with respect to the main body unit 20. The display unit 30 of the personal computer 10 can be rotated from the state shown in FIG. 1 via the state shown in FIG. 3 until the back side of the display screen 31 faces the front.

Figure 4:
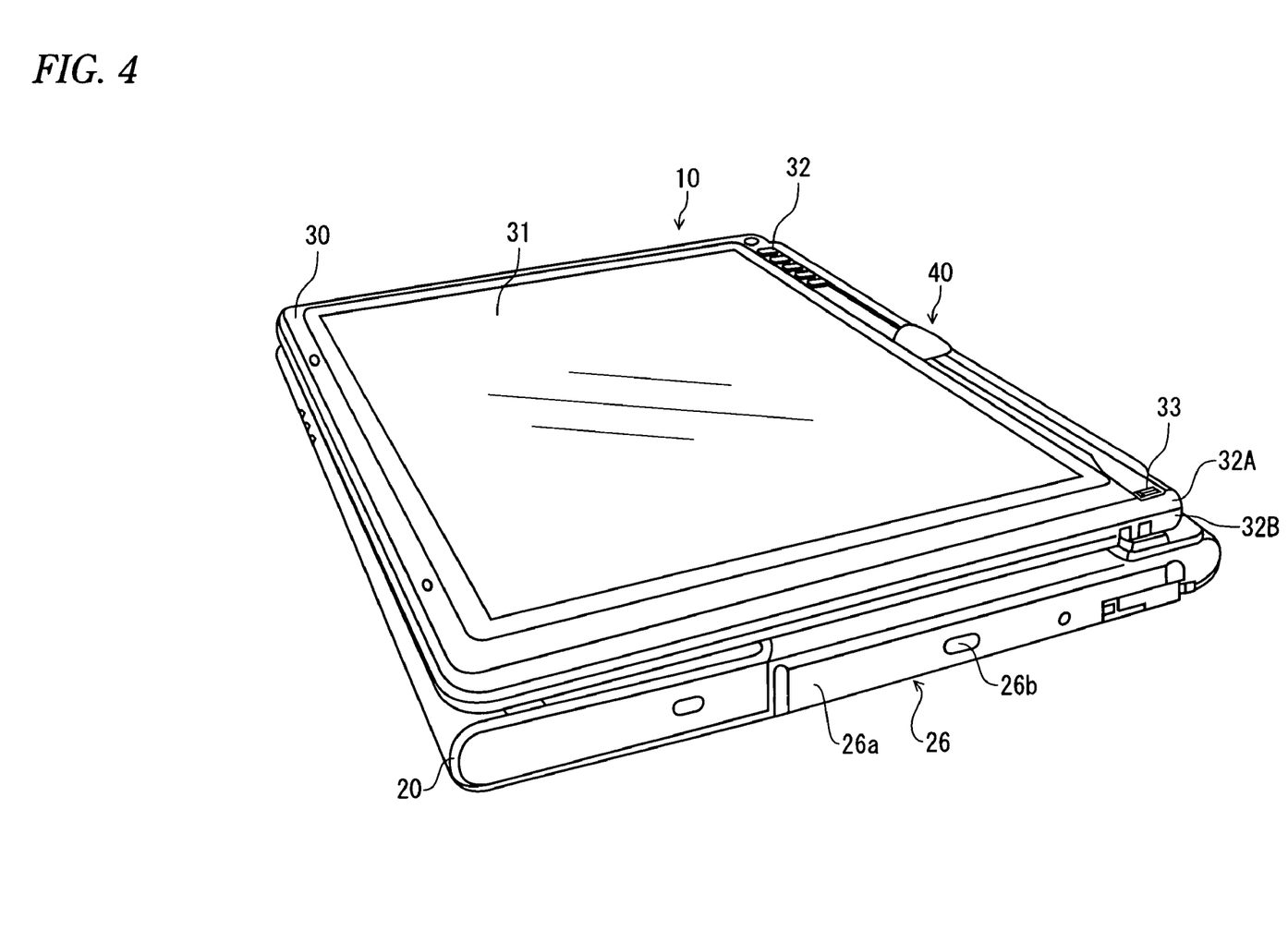
FIG. 4 is a perspective view showing a personal computer, where a display unit is overlaid on a main body unit with a display screen facing upward.

FIG. 4 is a perspective view showing the personal computer, the display unit 30 being overlaid on the main body unit 20 with the display screen 31 facing upward.

The personal computer 10 gets in a second closed state shown in FIG. 4 when the display unit 30 is overlaid on the main body unit 20 with the back surface thereof with respect to the display screen 31 facing the main body unit 20 after the display unit 30 has been rotated from the state shown in FIG. 1 via the state shown in FIG. 3 until the back side of the display screen 31 faces the front. This second closed state corresponds to an example of a second state of use. Hereafter, "tablet mode" refers to an operation mode where the personal computer 10 is used in the second closed state.

As described above, the display screen 31 is a display screen with a pen input function, the display screen 31 having on the back side thereof an electromagnetic induction type digitizer for detecting the indicated position on the display screen. Usually, a user holds in one of his/her arms the personal computer 10 which is in the tablet mode, and operates the display screen with a stylus (not shown) in the other hand. In relation to the line of sight when holding in the arm the personal computer 10 which is in the tablet mode, the displayed image on the display screen 31 has the orientation thereof rotated 90 degrees from the open state shown in FIG. 1. That is, in the tablet mode, information is displayed on the display screen 31 with a direction perpendicular to the rotational axis of the display unit 30 as the up-and-down direction.

Next, the internal configuration of the personal computer 10 will be described.

Figure 5:
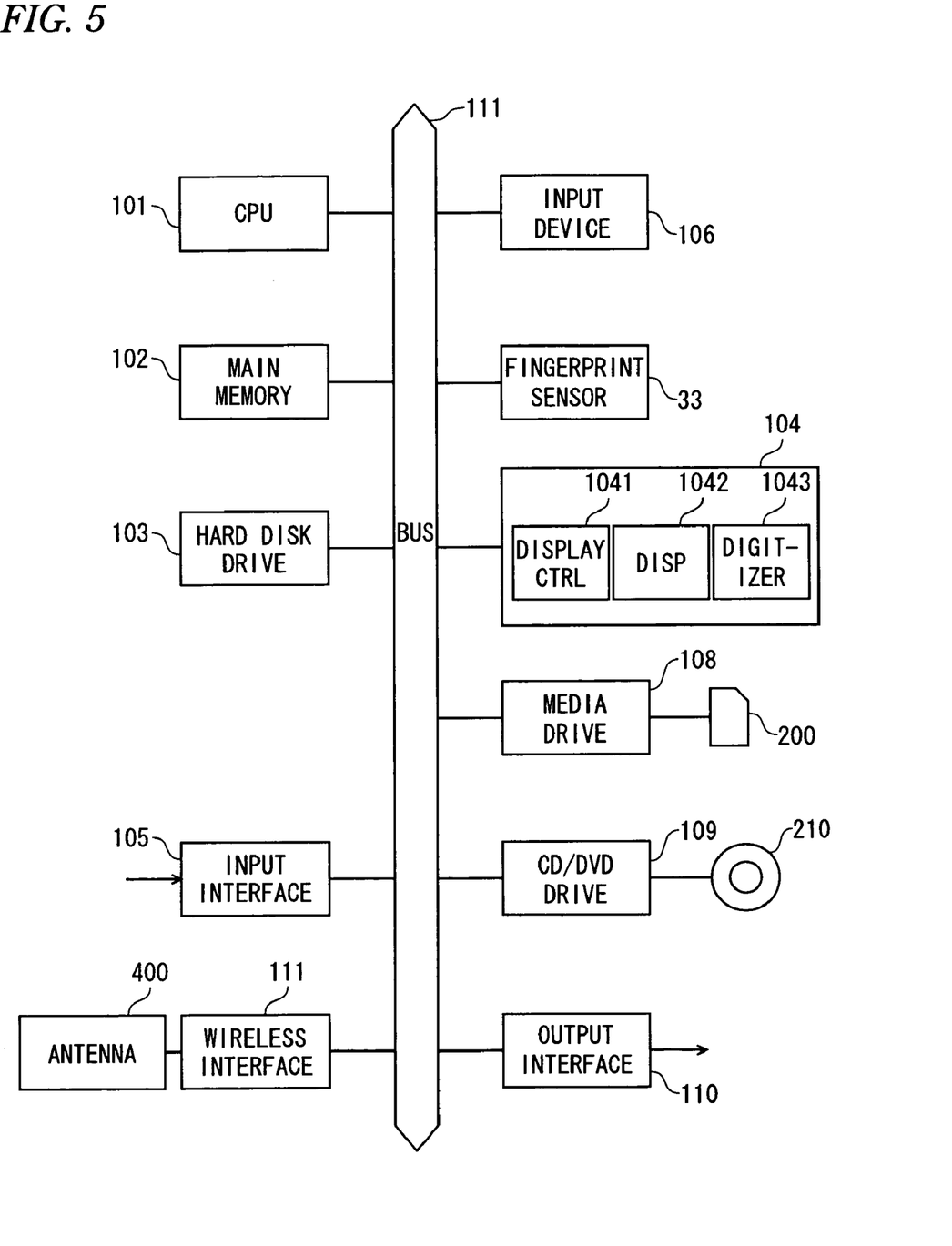
FIG. 5 illustrates an internal configuration diagram of a personal computer.

FIG. 5 is an internal configuration diagram of the personal computer 10.

As shown in FIG. 5, the personal computer 10 contains a CPU 101, a main memory 102, a hard disk drive 103, a display mechanism 104, a fingerprint sensor 33 shown in FIG. 1, an input device 106, a media drive 108, a CD/DVD drive 109, an input interface 105, an output interface 110, an antenna 400, a wireless interface 111 and the like. These various elements contained are interconnected via bus 111. The CPU 101 executes various programs. In the main memory 102 are developed programs read from the hard disk drive 103 for execution by the CPU 101. The hard disk drive 103 stores various programs, data and the like. The display mechanism 104 conducts process(es) relating to displaying information. The input device 106 includes the keyboard 21, the track pad 22 and the like. The media drive 108 accesses a small recording medium 200 loaded therein. The CD/DVD drive 109 accesses a CD-ROM 210 or DVD loaded therein. The input interface 105 inputs data from external device(s). The output interface 110 outputs data to external device(s). The antenna 400 transmits and receives radio waves. The wireless interface 111 performs wireless communication using the antenna 400. The display mechanism 104 is comprised of a display controller 1041, a display 1042 and a digitizer 1043. The display controller 1041 controls direction and the like of information displayed on the display screen 31 shown in FIG. 1. The display 1042 displays information on the display screen 31. The digitizer 1043 is mounted on the back side of the display screen 31 and detects a position indicated by a stylus. The display controller 1041 corresponds to an example of a display control unit. The antenna 400 corresponds to an example of an electronic component and also corresponds to an example of an antenna.

Next, a method of disposing signal lines connecting the antenna 400 mounted on the display unit 30 with the CPU 101 mounted in the main body unit 20 will be described in detail.

Figure 6:
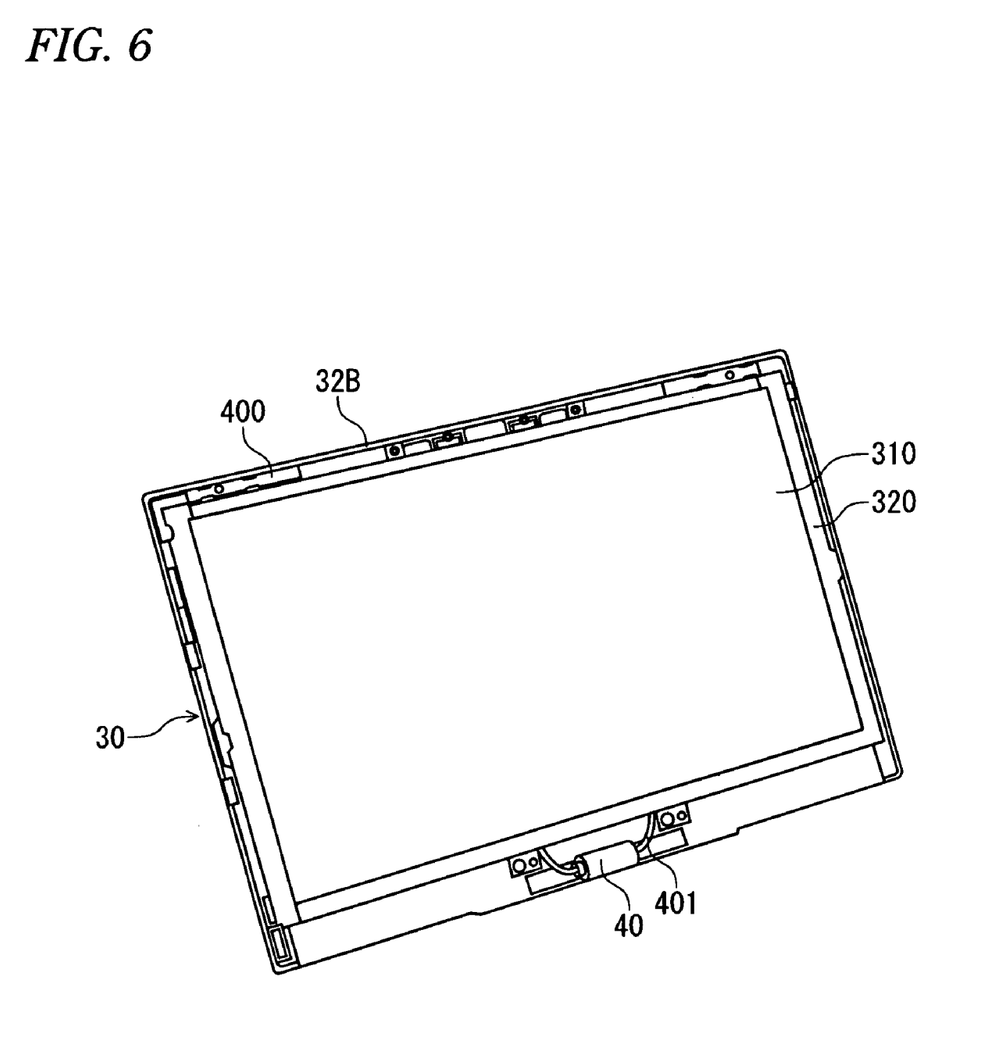
FIG. 6 is a view illustrating a display unit with a front cover shown in FIG. 1 removed.

FIG. 6 is a view showing the display unit 30 with the front cover 32A shown in FIG. 1 removed.

A display panel 310 has the display screen 31 shown in FIG. 1 formed on the surface thereof, and has the digitizer 1043 (see FIG. 5) arranged on the back side. The display panel 310 has resilient members 320 attached on both side edges thereof.

The rear cover 32B of the display unit 30 accommodates the display panel 310 with the resilient members 320 attached, and has the antenna 400 which transmits and receives radio waves attached above. A signal line 401 is connected to the antenna 400. The signal line 401 extends from the antenna 400 through the connector member 40 to be connected to the CPU 101 (see FIG. 5) in the main body unit 20 shown in FIG. 1. The signal line 401 corresponds to an example of a signal line. While FIG. 6 is illustrated with a signal line of an antenna, the present invention is not limited to a particular signal line and may include any electronic component.

Figure 7:
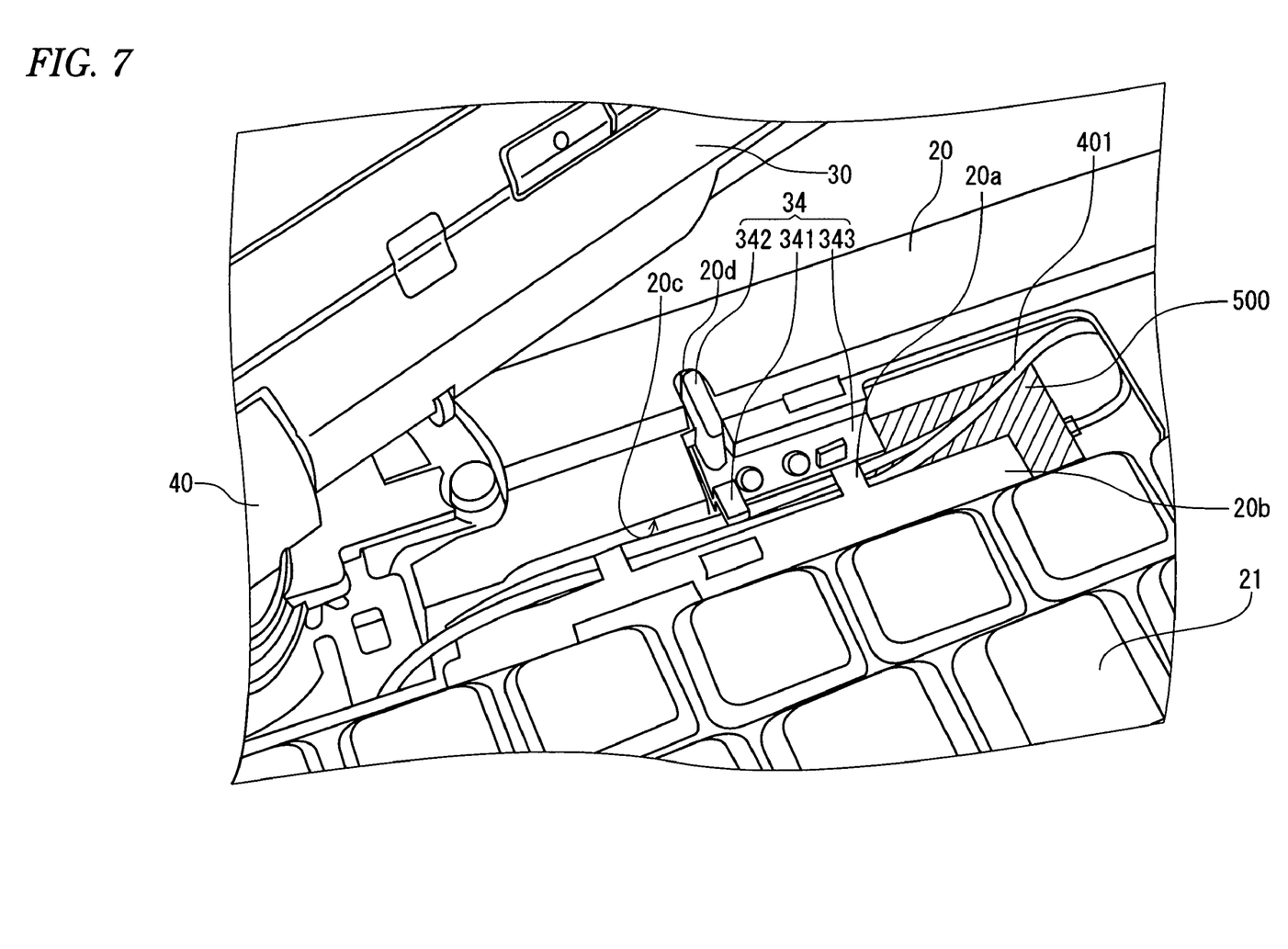
FIG. 7 illustrates an internal structural view of a main body unit around where a display unit receiving member is provided.

FIG. 7 is an internal structural view of the main body unit 20 around where the display unit receiving member 34 is provided.

The main body unit 20 accommodates therein a control circuit board 500 which includes the CPU 101 shown in FIG. 5 and the like. The main body unit 20 has a cover 20b over the control circuit board 500, preventing the control circuit board 500 from contacting with other components. The cover 20b has a groove 20c extending from the connector member 40 toward the control circuit board 500, and has a cover side fin portion 20a protruding rearward to extend over the groove 20c. The cover 20b corresponds to an example of a signal line path forming member. The groove 20c corresponds to an example of a signal line path. The cover side fin portion 20a corresponds to an example of a second fin portion.

The display unit receiving member 34 has a fixed portion 343, a receiving portion 342 and a receiving side fin portion 341. The fixed portion 343 is fixed to the main body unit 20. The receiving portion 342 extends upward from the fixed portion 343 and protrudes from a hole 20d provided in the main body unit 20 so as to receive the display unit 30 from below. The receiving side fin portion 341 protrudes frontward from the fixed portion 343 to extend over the groove 20c. The fixed portion 343 corresponds to an example of a base portion. The receiving portion 342 corresponds to an example of a receiving portion. The receiving side fin portion 341 corresponds to an example of a first fin portion. The receiving portion 342 has a lower hardness than the front cover 32A and rear cover 32B of the display unit 30, which will contact with the receiving portion 342. The receiving side fin portion 341 has a shape which is resiliently deformable. The lower hardness of the receiving portion 342 than the front cover 32A (FIG. 4) and rear cover 32B alleviates wear of the front cover 32A and rear cover 32B by the receiving portion 342. In an embodiment, the display unit receiving member 34 is composed of Hytrel (registered trademark: manufactured by Toray Industries, Inc.). The receiving side fin portion 341 is formed to be thinner than the receiving portion 342 and the like, so that it bends in the up-and-down direction.

The signal line 401 extending from the antenna 400 shown in FIG. 6 is disposed in the groove 20c in the main body unit 20, and connected to the control circuit board 500. The signal line 401 is held in the groove 20c by the cover side fin portion 20a and the receiving side fin portion 341. Therefore the problem associated with the signal line 401 getting out of the groove 20c and interfering with assembly of other electronic components, or is pulled out of the control circuit board 500 or the like is prevented.

The signal line 401 is connected with the antenna 400 shown in FIG. 6, disposed as far as the connector member 40, inserted through the connector member 40, and disposed in the groove 20c of the main body unit 20. When the signal line 401, in wiring the same, is pushed in from above the receiving side fin portion 341, it fits in the groove 20c since the receiving side fin portion 341 bends, and it is held in the groove 20c since the receiving side fin portion 341 returns. Thus, in an embodiment, the signal line 401 can be readily fixed without requiring the use of tapes or the like merely by pushing the signal line 401 into the groove 20c, thereby saving trouble in the work in the manufacturing process. Moreover, in an embodiment, since the display unit receiving member 34 serves the role of receiving the display unit 30 as well as the role of holding the signal line 401, the parts count is not increased and the manufacturing cost can be held down.

Although the above-described embodiment explains an example in which the electronic device is a personal computer having the tablet mode, it may be a personal computer not equipped with the tablet function. The electronic device may also be an electronic organizer or the like.

In addition, although the above-described embodiment explains an example in which the display unit receiving member is composed of Hytrel (registered trademark: manufactured by Toray Industries, Inc.), it may also be composed of a plastic other than Hytrel (registered trademark: manufactured by Toray Industries, Inc.) or the like.

In addition, although the above-described embodiment explains an example in which the display unit receiving member is composed of one material, the receiving portion or the first fin portion of the receiving member may be composed of different materials by two-shot molding, for example.

Although a few preferred embodiments of the present invention have been shown and described, it would be appreciated by those skilled in the art that changes may be made in these embodiments without departing from the principles and spirit of the invention, the scope of which is defined in the claims and their equivalents.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An electronic device comprising:
   an upper housing;
   a lower housing to which the upper housing is connected so as to be openable and closable, the lower housing formed with a signal line path running near a connecting portion with the upper housing and the signal line path having a signal line disposed therein; and
   a receiving member having a base portion accommodated in the lower housing, a receiving portion provided upright on the base portion and protruding above an upper surface of the lower housing to receive the upper housing from below, and a first fin portion protruding frontward from the base portion to extend over the signal line path.

2. The electronic device according to claim 1, comprising:
   a signal line path forming member forming the signal line path in cooperation with the receiving member, and the signal line path forming member including a second fin portion protruding rearward to extend over the signal line path.

3. The electronic device according to claim 1, wherein the upper housing is connected with the lower housing by a biaxial connector member which is openable and closable with respect to the lower housing and rotatable about a rotational axis perpendicular to an upper surface of the lower housing in an open state.

4. The electronic device according to claim 1, wherein the receiving portion of the receiving member is a lower hardness than a certain portion of the upper housing which contacts with the receiving portion.

5. The electronic device according to claim 1, wherein the first fin portion is resiliently deformable.

6. The electronic device according to claim 1, wherein the signal line path is formed in a form of a groove in the lower housing.

7. The electronic device according to claim 1, wherein the upper housing comprises a display screen for displaying information.

8. The electronic device according to claim 7, comprising:
   a display controller displaying information on the display screen in a first display mode and a second display mode, and
   wherein the first display mode is a mode to display the information on the display screen with a direction of a rotational axis as an up-and-down direction in a first state of use in which the upper housing is opened with respect to the lower housing, and
   the second display mode is a mode to display the information with a direction perpendicular to the rotational axis as an up-and-down direction in a second state of use in which the upper housing is overlaid on the lower housing with the display screen facing outside.

9. The electronic device according to claim 1, wherein the lower housing comprises a keyboard for inputting instructions in accordance with a user operation.

10. The electronic device according to claim 1, wherein the upper housing and the lower housing respectively accommodate an electronic component, and the signal line disposed in the signal line path connects the electronic component accommodated in the upper housing with the electronic component accommodated in the lower housing.

11. The electronic device according to claim 10, wherein the electronic component accommodated in the upper housing comprises a wireless antenna.

12. A receiving member used in an electronic device, the electronic device including an upper housing and a lower housing to which the upper housing is connected so as to be openable and closable, and in which a signal line path running near a connecting portion with the upper housing is formed, the signal line path having a signal line disposed therein, the receiving member receives the upper housing, the receiving member comprising:

a base portion accommodated in the lower housing;

a receiving portion provided upright on the base portion and protruding above an upper surface of the lower housing to receive the upper housing from below; and a first fin portion protruding frontward from the base portion to extend over the signal line path.

13. The receiving member according to claim 12, wherein the receiving portion is a lower hardness than a certain portion of the upper housing which contacts with the receiving portion.

14. The receiving member according to claim 12, wherein the first fin portion is resiliently deformable.

* * * * *